United States Patent [19]

Sanda et al.

[11] 4,063,536
[45] Dec. 20, 1977

[54] APPARATUS FOR FEEDING WATER INTO THE AIR/FUEL MIXTURE PASSAGE OF AN INTERNAL COMBUSTION ENGINE

[75] Inventors: Shougo Sanda, Okazaki; Tokuta Inoue, Mishima; Kiyohiko Oishi; Toshio Yamada, both of Susono, all of Japan

[73] Assignee: Toyota Jidosha Kogyo Kabushiki Kaisha, Toyota, Japan

[21] Appl. No.: 686,883

[22] Filed: May 17, 1976

[30] Foreign Application Priority Data

Nov. 7, 1975 Japan .................. 50-133100

[51] Int. Cl.² .......................... F02D 19/00
[52] U.S. Cl. ..................... 123/25 J; 123/25 L; 261/18 A
[58] Field of Search .......... 123/25 J, 25 L, 25 M, 123/25 N, 25 R, 25 A; 261/18 A

[56] References Cited

U.S. PATENT DOCUMENTS

| | | | |
|---|---|---|---|
| 2,468,941 | 5/1949 | Orr | 123/25 J |
| 2,533,863 | 12/1950 | Wirth et al. | 123/25 J |
| 2,548,150 | 4/1951 | Fox | 123/25 J |
| 2,576,196 | 11/1951 | Stanalis | 123/25 N X |
| 2,670,940 | 3/1954 | Hunt | 123/25 J X |
| 2,756,729 | 7/1956 | Wolcott | 123/25 L |
| 3,196,606 | 7/1965 | Cholvin et al. | 123/25 J X |
| 3,631,843 | 1/1972 | Yeiser | 123/25 L |
| 3,845,745 | 11/1974 | Dunlap et al. | 123/25 J X |

FOREIGN PATENT DOCUMENTS

663,669   5/1963   Canada .................. 123/25 J

*Primary Examiner*—Charles J. Myhre
*Assistant Examiner*—Ira S. Lazarus
*Attorney, Agent, or Firm*—Finnegan, Henderson, Farabow & Garrett

[57] ABSTRACT

Apparatus for feeding water to the air/fuel mixture passage between the air/fuel mixing device and combustion chamber of an internal combustion engine including a main conduit for supplying water to the mixture passage, a valve member for opening and closing the conduit, the valve member being biased into the closed position, a diaphragm communicating on one side directly to the mixture passage for actuating the valve member to an open position and on the other side through a pressure delay chamber with the mixture passage, wherein the conduit is opened only by a relatively abrupt increase in pressure in the mixture passage, and the closing is delayed until the pressure equalizes across the diaphragm. Water may be supplied to the conduit directly by a pump, or by a pressure differential or by means of a reservoir having access to a water supply. Water may be pumped into and out of the reservoir by a diaphragm or a piston in the reservoir, the diaphragm being actuated by a pressure differential, or the piston being actuated by a pressure differential or by the accelerator.

A smaller ancillary conduit may by-pass the valve member, and a stop valve, sensitive to the pressure differential between the mixture passage and the atmosphere, may shut off both the main conduit and the ancillary conduit when the engine is not operating.

The feeding of water into the mixture passage reduces the nitrogen oxides contained in the exhaust gases and improves the fuel consumption.

29 Claims, 9 Drawing Figures

APPARATUS FOR FEEDING WATER INTO THE AIR/FUEL MIXTURE PASSAGE OF AN INTERNAL COMBUSTION ENGINE

BACKGROUND OF THE INVENTION

1. Field of the Invention

This invention relates to an internal combustion engine provided with a water-feeding mechanism, and more particularly to an apparatus which feeds water into the air/fuel mixture intake passage of the combustion chamber as a function of the pressure in the mixture passage.

2. Description of the Prior Art

Among many attempts to reduce the quantities of harmful components, particularly nitrogen oxides, contained in exhaust gases from an internal combustion engine, there are a lean mixture burning method, stratified mixture burning method, catalytic method, and exhaust-gas recirculating method. However, these attempts pose many problems to be solved in improving fuel consumption, output of an engine and durability of associated devices, and for reducing the quantity of nitrogen oxides.

On the other hand, another attempt is known, in which water is added into the air/fuel mixture supply system for an engine for reducing the quantity of nitrogen oxides (NOx). However, this attempt suffers from shortcomings which present many problems such as a need to use a considerable amount of water, the use of a large-sized water tank, corrosion of a tank, additional cost of such a tank, and premature deterioration of engine oil. Hitherto, there has been proposed no water-feeding or adding mechanism which is well controlled and may add water to an air/fuel mixture charge for an engine as a function of the pressure in the air/fuel mixture passage, depending on the specific mode of an engine run, the feeding beginning with a relatively abrupt increase in pressure in the mixture passage and continuing for a limited period of time after the pressure decreases.

SUMMARY OF THE PRESENT INVENTION

It is accordingly an object of the present invention to provide a water-feeding or -adding mechanism for an internal combustion engine, which may feed or add a suitable amount of water to air/fuel mixture for an engine in a well controlled manner.

It is another object of the present invention to provide an internal combustion engine having a water-feeding mechanism which may feed a suitable amount of water to the air/fuel mixture charge, depending on specific modes of an engine run.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the water-feeding apparatus of this invention, for use in an internal combustion engine utilizing an air/fuel mixing device, a combustion chamber and a mixture passage for conducting air/fuel mixture from the mixing device to the combustion chamber comprises means for supplying water including a main conduit opening into the mixture passage, a valve member for controlling the flow of water from the water-supplying means by opening and closing the main conduit, means sensitive to a relatively abrupt increase of pressure in the mixture passage for actuating the valve member for opening the main conduit; and means for delaying the closing of the main conduit by the valve member under bias as the pressure in the mixture passage is decreased.

It is preferred that the valve-actuating means includes first and second diaphragm chambers, the first diaphragm chamber communicating with the mixture passage, a diaphragm separating the first and second diaphragm chambers, the diaphragm being connected to the vavle member, and a spring acting on the diaphragm and valve member in a direction to close said valve member.

It is also preferred that the delaying means includes a pressure-delay chamber communicating with the second diaphragm chamber and the mixture passage.

It is further preferred that the means for supplying water include an ancillary conduit opening into the mixture pressure and by-passing the valve member.

It is still further preferred that the water-feeding apparatus include valve means sensitive to a pressure differential between the mixture passage and the atmosphere for closing both the main and ancillary conduits when the engine is not operating.

It is also preferred that the water-supply means include a reservoir containing a piston for forcing water through the conduits and for pumping water into the reservoir, and also includes a pressure-differential diaphragm connected to the piston and first and second pressure-differential chambers separated by the pressure differential diaphragm. The pressure-differential chambers communicate with the mixture passage through first and second passages, respectively, the first passage including means for delaying communication of pressure with respect to the second passage and thereby actuating the piston against a bias.

BRIEF DESCRIPTION OF THE DRAWINGS

The accompanying drawings, which are incorporated in and constitute a part of this specification, illustrate embodiments of the invention and, together with the description, serve to explain the principles of the invention.

Description of The Preferred Embodiments

Reference will now be made in detail to the present preferred embodiments of the invention, examples of which are illustrated in the accompanying drawings.

Figure 1:
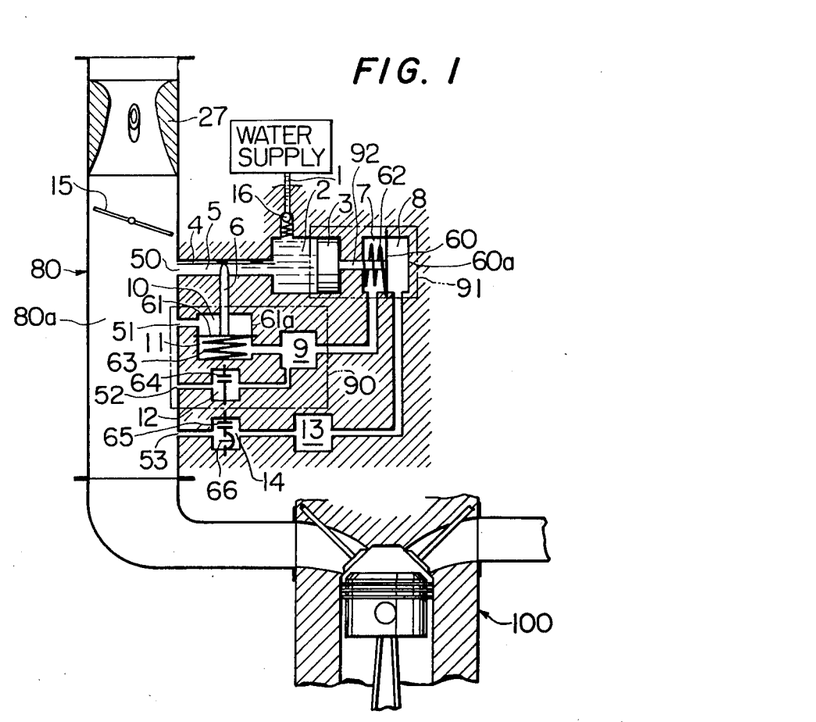
FIG. 1 is a schematic view illustrative of a first embodiment of water-feeding mechanism according to the present invention.

As embodied herein and referring now to FIG. 1, a water reservoir 2 having a main conduit 5 of relatively large diameter, and an ancillary conduit 4 of relatively small diameter, both open from a first outlet 50 to an air/fuel mixture intake passage 80a leading to the combustion chamber of an engine 100, the first outlet 50 being positioned downstream from a throttle valve 15 of a carburetor 80. The water reservoir 2 communicates by way of a check valve 16 and an inlet 1 with a water supply.

Fitted in the water reservoir 2 is a piston 3 which is coupled by means of a rod 92 to a pressure-differential diaphragm 60 in a chamber 60a. The diaphragm 60 is secured to the walls of the chamber 60a in a manner to partition the chamber into two pressure-differential chambers 7 and 8. A spring 62 is placed in the chamber 7, being confined between a wall of the chamber 7 and the diaphragm 60.

The piston 3, spring 62, and pressure-differential chambers 7, 8 separated by the diaphragm 60 constitute a water-pumping mechanism 91.

The conduit 5 of larger diameter is opened and closed by an elongated valve member 6, as described hereinafter. The valve member 6 is secured to valve-actuating diaphragm 61 which in turn is secured to the walls of a chamber 61a, thus partitioning the chamber 61a into two diaphragm chambers 10 and 11. Confined between a wall of the diaphragm chamber 11 and the diaphragm 61 is a spring 63. The diaphragm chamber 10 communicates by way of a second outlet 51 with the mixture intake passage 80a and the diaphragm chamber 11 communicates with a mixture reservoir 9 which in turn communicates with the pressure-differential chamber 7. The mixture reservoir 9 also communicates by way of a pressure delay chamber 12 having a throttle 64 therein through a third outlet 52 with the mixture intake passage 80a.

The chamber 60a divided by the diaphragm 61 to form diaphragm chambers 10, 11, spring 63, mixture reservoir 9, pressure delay chamber 12, and third outlet 52 constitute a mechanism 90 for actuating the valve member 6.

As embodied herein, the pressure-differential chamber 8 of the water-pumping mechanism 91 also communicates with the mixture intake passage 80a by way of a mixture reservoir 13, a pressure delay chamber 14 and a fourth outlet 53. The pressure delay chamber 14 includes a throttle 65 of substantially equal capacity with the throttle 64, and a check valve 66, the check valve allowing the pressure of the air/fuel mixture therethrough only toward the chamber 8. Any pressure build-up in the mixture intake passage 80a will be transmitted to the pressure-differential chamber 8 sooner than it is transmitted to the chamber 7, because of the provision of a combination of the check valve 66 and the throttle 65 in the pressure delay chamber 14 in contrast to the provision of a single throttle 64 in the pressure delay chamber 12.

In operation, when the throttle valve 15 of the carburetor maintains a small opening, there is created a vacuum or a negative pressure in the mixture intake passage 80a and the main conduit 5 is kept closed by the valve member 6 due to the bias of the spring 63. In this condition water is supplied from the water chamber 2 through the ancillary conduit 4 into the mixture intake passage 80a in an amount which may improve fuel consumption at the time of low-load running of an engine. Likewise, in the modes of normal running and deceleration of an engine, the conduit 5 of larger diameter is maintained closed by means of the valve body 6, so that water will not be supplied through the conduit 5 into the mixture intake passage 80a.

On the other hand, when the throttle valve 15 makes an abrupt change in opening to admit a larger supply of air/fuel mixture in acceleration, the vacuum level will be decreased, i.e., pressure will be built up, in the mixture intake passage 80a. Thus, the chamber 10 of the valve-actuating mechanism 90 receives the built up pressure immediately, so that the diaphragm 61 is deflected against the force of the spring 63 taking along the valve member 6 secured thereto and opening the main conduit 5.

The increased pressure in the mixture intake passage 80a also acts on the mixture reservoir 13 and then the pressure-differential chamber 8 at a delayed timing, as compared with the diaphragm chamber 10, because of the presence of the throttle 65 and the check valve 66.

However, the increased pressure acts on the pressure-differential chamber 7 at a further delayed timing, as compared with the chamber 8, because of the presence of the single throttle 64 in the delay chamber 12. This brings about a pressure difference between the chamber 7 and the chamber 8, as well as between the chamber 10 and the chamber 11. The pressure difference between the chamber 7 and the chamber 8 causes deflection of the diaphragm 60 against the bias of the spring 62 so as to force the piston 3 forward. Water will thus be fed through the conduit 5 of larger diameter into the mixture intake passage 80a, in an amount corresponding to the stroke of the piston 3.

The pressures in the chambers 7, 8 will be equalized after a certain lapse of time, because the pressure will be built up therein to a level of the air/fuel mixture in the mixture intake passage 80a through the respective throttles 64 and 65 and check valve 66. This returns the piston 3 to its home position under the bias of the spring 62. By the return action of the piston 3, water will be pumped from the water supply through the inlet 1 into the water chamber 2.

The closing of the conduit 4 by the valve member 6 will be delayed, as the pressure in the mixture passage 80a decreases, by the pressure delay chamber 12 until the pressure differential across the diaphragm 61 is at least not greater than the bias of the spring 62.

In accordance with the invention, the water-feeding mechanism may include means for completely stopping the flow of water from the water chamber to the air/fuel mixture intake pipe when the engine is not operating.

Figure 2:
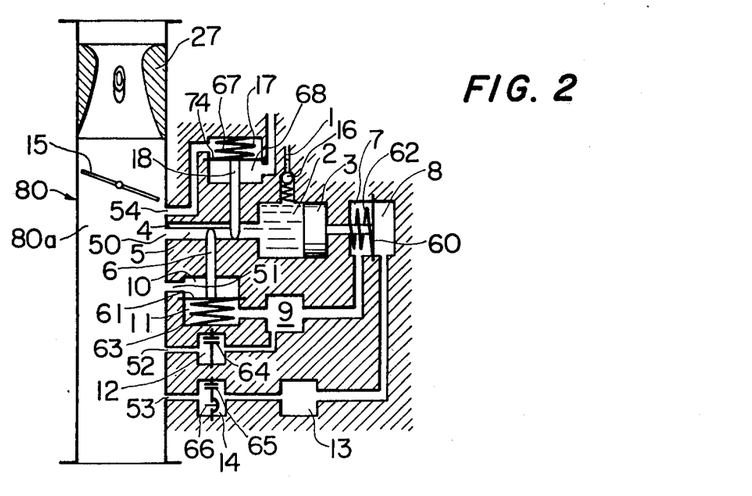
FIG. 2 is a schematic view illustrative of the embodiment of the water-feeding mechanism of FIG. 1, also including means for interrupting feeding of water during the stoppage of the engine.

As embodied herein, the arrangement shown in FIG. 2 is similar to that shown in FIG. 1, but also provides a valve member 18 for controlling the water flow in both the main and ancillary conduits 5, 4. The valve member 18 is secured to a diaphragm 74 in a chamber 68, the diaphragm 74 and valve member 18 being biased by a spring 67 toward closing both the conduits 4, 5. The diaphragm 74 partitions the chamber 68 into the chambers 17, 18, the chamber 17 communicating by way of an outlet 54 with the mixture intake passage 80a, and the chamber 68 communicating with the atmosphere. The bias of the spring 67 opposes the vacuum pressure developed in the mixture intake passage 80a.

Thus, when the engine is stopped, and there is no vacuum in the mixture intake passage 80a, the conduits 4, 5 are closed by the valve member 18 so as to interrupt the feeding of water. On the other hand, when the engine is running and a vacuum is created in the mixture intake passage 80a as well as the chamber 17, the diaphragm 74 is deflected, withdrawing the valve member 18 from the water conduits 4, 5 thereby allowing the feeding of water to the mixture intake passage 80a.

In accordance with the invention, the water-feeding mechanism may include means for retarding the build-up of pressure in the pressure-differential chamber 7 of the water-pump mechanism 91.

Figure 3:
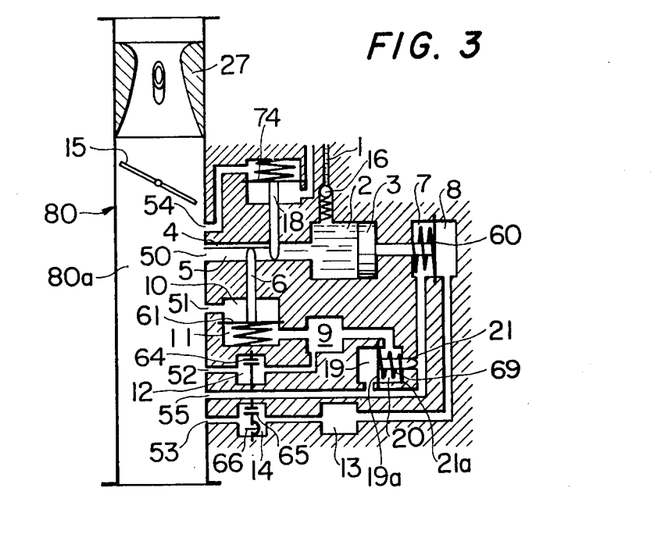
FIG. 3 is a schematic view illustrative of the embodiment of the water-feeding mechanism of FIG. 2, also including means for delaying the build-up of pressure in a chamber in the water-pumping mechanism.

As embodied herein and illustrated in FIG. 3, the arrangement is similar to that shown in FIG. 2, but including a valve member 21 for a controlling communication between the mixture intake passage 80a and the pressure-differential chamber 7, the valve member 21 being sensitive to the pressure differential between the mixture reservoir 9 and the intake passage 80a. A chamber 21a is divided into subchambers 19 and 20 by a diaphragm 19a, the diaphragm being secured to the valve member 21. The subchamber 19 communicates with the intake passage 80a and the chamber 7, and the subchamber 20 communicates with the mixture reservoir 9. A spring 69 biases the diaphragm 19a to withdraw the valve member 21 and open the communication between an outlet 55 in the air/fuel mixture intake passage 80a and the chamber 7.

Thus, when a pressure is built up in the mixture intake passage 80a, the diaphragm 19a is deflected so as to push the valve body 21 toward closing the passage leading from the chamber 7 to the outlet 55. As the pressure in the mixture reservoir 9 is being more slowly built up, the valve member 21 slowly opens the passage leading from the outlet 55 to the chamber 7 for returning the piston 3 to its open position. Thus, the valve member 21 retards the pressure build-up in the chamber 7 and the return of the piston 3 under the bias of spring 7.

In accordance with the invention, it may be desired to simplify the water-pumping mechanism with its pressure-differential generating means.

Figure 4:
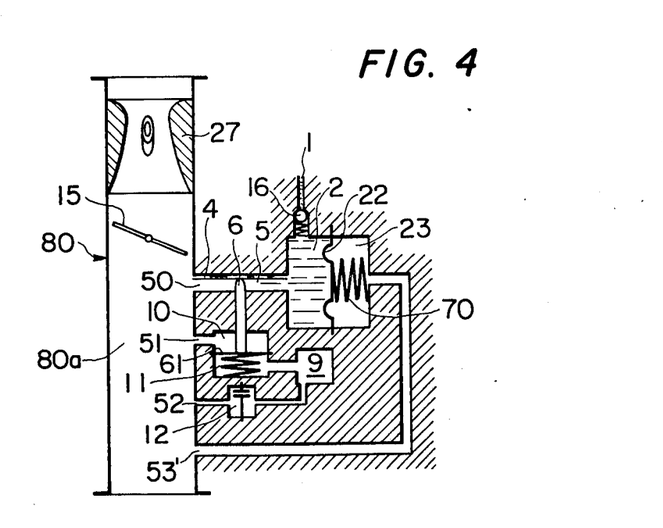
FIG. 4 is a schematic view illustrative of a second embodiment of the water-feeding mechanism according to the present invention, utilizing a diaphragm for pumping water.

As embodied herein, and illustrated in FIG. 4, the water reservoir 2 may be fitted with a diaphragm 22 instead of a piston. The diaphragm 22 is secured to the wall of the water reservoir for forming a subchamber 23 communicating directly with the mixture intake passage 80a via outlet 53', as well as a water-containing subchamber communicating with outlet 50 both through the main duct 5 under control of the valve member 6 and the ancillary duct 4. A spring 70 in the subchamber 23 tends to bias the diaphragm 22 toward the outlet 50 and to stabilize the diaphragm.

With the build-up of the pressure in the intake passage 80a water is provided by the resiliency of the diaphragm 22 and the pressure of the spring 70. With the stabilization of pressure in the mixture intake passage 80a, the diaphragm is restored to its original position pumping water into the chamber 80a via the water intake conduit 1.

This simplification of the water-feeding mechanism of the invention thus does not require the chamber 60a, the mixture reservoir 13 and delay chamber 14.

In accordance with the invention, it may be preferred to actuate the water-feeding mechanism by the accelerator.

Figure 5:
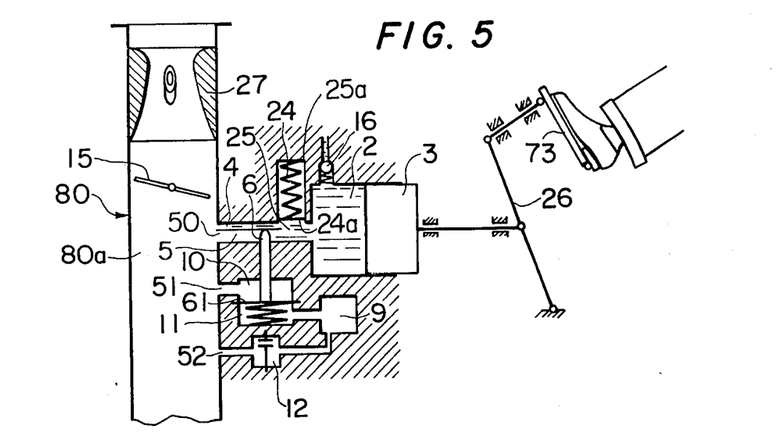
FIG. 5 is a schematic view illustrative of a third embodiment of the water-feeding mechanism according to the present invention, utilizing a piston connected to the accelerator pedal for pumping water.

As embodied herein, and illustrated in FIG. 5, the embodiment of FIG. 4 is modified to substitute a piston 3 for the diaphragm and to interconnect the piston 3 with an accelerator 26. Upon depression of the accelerator pedal 73, the piston 3 is displaced as a function of the movement of the accelerator pedal.

A pressure chamber 25a, including a spring 24 and a piston 24a, absorbs a portion of the force of the piston 3 when the accelerator pedal 73 is depressed, storing water in a chamber 25.

Any stored energy in the spring will force water from the chamber 25 and the water reservoir 2 through the outlet 50. The water reservoir 2 will be recharged with water by the restoration of the accelerator 26 to its original position.

In an alternative embodiment, in accordance with the invention, the water-pumping mechanism and the vlave-actuating mechanism may be actuated by the vacuum prevailing in a venturi in the carburetor.

Figure 6:
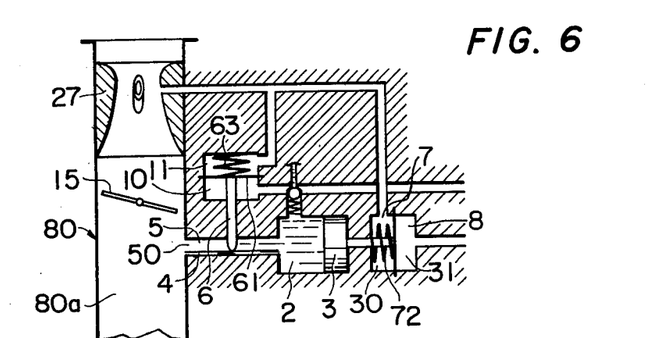
FIG. 6 is a schematic view illustrative of a fourth embodiment of the water-feeding mechanism according to the present invention, utilizing a diaphragm sensitive to the pressure in a venturi in the carburetor for actuating a water-pumping piston.

As embodied herein and illustrated in FIG. 6, the pressure-differential chamber 7 of the water-pumping mechanism and chamber 11 of the valve-actuating mechanism communicate with a venturi 27 in the carburetor. Chamber 8 and chamber 10 of the respective mechanisms communicate with the atmosphere. The mixture reservoirs 9 and 13 and the pressure delay chambers 12 and 14 of FIG. 1, for example, are thus not required in this embodiment.

The reduction in pressure, i.e., the increase in vacuum, in the venturi 27 due to an increase in the amount of air at the time of acceleration results in pressure differences between the chamber 11 having a spring 63 therein and the chamber 10 communicating with the atmosphere, and between the chamber 7 having a spring 72 therein and the chamber 8 communicating with the atmosphere, so that the valve member 6 opens the duct 5 and the piston 3 displaced. On the other hand, in the high load and normal running mode of an engine, the duct 5 is closed so that the feeding of water will be interrupted except for the ancillary duct 4.

In accordance with the invention, the piston in the water-pumping mechanism may be dispensed with and the water fed in accordance with the pressure differential between the mixture intake passage and atmosphere.

Figure 7:
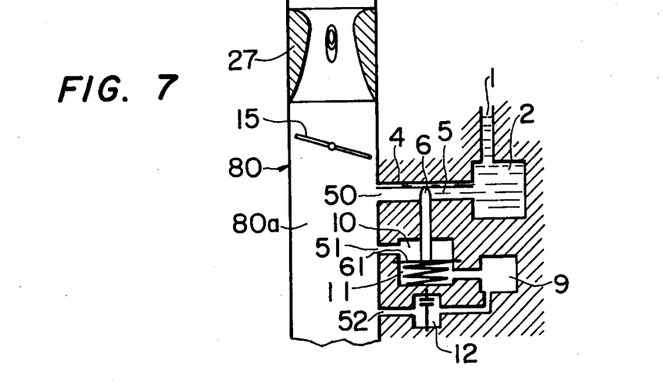
FIGS. 7 and 8 are schematic representations of simplified embodiments of the water-feeding mechanism according to the present invention.

As embodied herein and illustrated in FIG. 7, the water reservoir 2 communicates with the outlet 50 into the air/fuel mixture intake 80a by the main and ancillary water ducts 5, 4 and with a water supply under atmospheric pressure through the water feed conduit 1.

When pressure builds up in the mixture intake passge 80a opening the main water duct 5 through the valve member 6, pressure in the passage 80a is still less than that of the atmosphere. Water will, therefore, be fed from the water reservoir 2 into the mixture intakes passage 80a according to the difference in pressure between the pressure in the intake passage 80a and the atmosphere.

In accordance with the invention, the ancillary water duct between the water supply and the air/fuel mixture intake passage may not be required and water may be fed into the intake passage only during periods of increased pressure in the intake passage, i.e. during acceleration.

Figure 8:
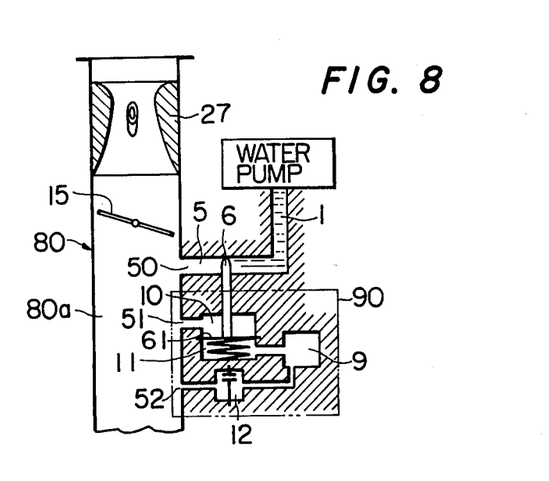

As embodied herein, and shown in FIG. 8, the water conduit 1 leads directly from a water pump to the outlet 50 under the control of the valve member 6. In this simplified embodiment of the invention, the valve-actuating mechanism 90 acts with the valve member 6, the water conduit 1 and the water pump to feed water into the air/fuel mixture passage.

The embodiments of the invention shown in FIGS. 1 to 7 feed water by utilizing the vacuum or a negative pressure in the air/fuel mixture passage thus dispensing with a water pump. In addition, as is apparent from the foregoing description, there are provided two passages having relatively small and large diameters, so that the fuel consumption both at times of low load running and of acceleration of an engine may be improved. In addition, according to the embodiments shown in FIGS. 1 to 6,, the counter-pressure in the water-feeding ducts, due to the build up of a pressure in the mixture intake passage, tending to reduce the amount of water being added, is compensated for by the provision of the piston or diaphragm which forces water through the outlet into the air/fuel mixture intake passage.

The following table represents, for reference, the ratio in the quantity of NOx exhausted from an engine in the specific modes of the 10 mode runs of an engine, as compared with the total quantity of NOx exhausted.

TABLE

| Mode | time required (sec) | ratio of the time to the total time in 10 modes | ratio of fuel consumption in 10 modes | ratio of quantity of NO x to the total quantity of NO x in 10 modes |
| --- | --- | --- | --- | --- |
| idle | 36 | 27 | 15 | 1 |
| acceleration 1 0–20 km/h | 10 | 7 | 9 | 9 |
| acceleration 2 0–40 km/h | 26 | 19 | 30 | 50 |
| acceleration 3 20–40 km/h | 18 | 13 | 20 | 30 |

As can be seen from the above table, 80 to 90% NOx of the total quantity is exhausted in the acceleration mode and the subsequent modes affected by the acceleration. (Refer to the acceleration modes 1, 2, 3, in the Table.) In view of the data given in this table, the improvements are specifically directed to the reduction in quantity of NOx in the specific engine running modes by providing two types of passages having relatively small and large diameters for feeding water in an amount which tends to minimize the quantity of NOx. Thus, an amount of water is added, but in reduced amounts, in periods other than acceleration with an increased advantage in minimizing the quantity of NOx.

Figure 9:
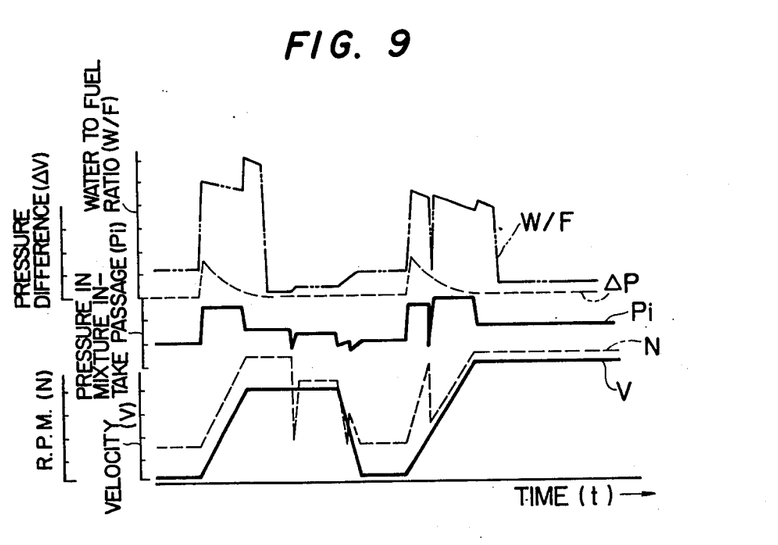
FIG. 9 is a graph illustrative of various operational characteristics in 10 modes of engine runs.

FIG. 9 is a diagram illustrative of the various factors incorporated in the 10 mode running of an engine in connection with the water-feeding mechanism according to the present invention.

It will be apparent to those skilled in the art that various modifications and variations could be made in the format of the invention without departing from the scope or spirit of the invention.

What is claimed is:

1. In an internal combustion engine utilizing an air/fuel mixing device, a combustion chamber and a mixture passage for conducting air/fuel mixture from the mixing device to the combustion chamber, water-feeding apparatus comprising:
   means for supplying water including a main conduit opening into the mixture passage;
   a biased valve member for controlling the flow of water from said water-supplying means by opening and closing said main conduit;
   means sensitive to a relatively abrupt increase in pressure in the mixture passage for actuating said valve member for opening said main conduit; and
   means for delaying the closing of said main conduit by said valve member under bias as said pressure in the mixture passage is decreased.

2. The water-feeding apparatus of claim 1 wherein said valve member-actuating means includes first and second diaphragm chambers, said first diaphragm chamber communicating with the mixture passage, a diaphragm separating said first and second diaphragm chambers, said diaphragm being connected to said valve member, and a spring acting on said diaphragm and said valve member in a direction to close said valve member.

3. The water-feeding apparatus of claim 2 wherein said delaying means includes a pressure-delay chamber communicating with said second diaphragm chamber and the mixture passage.

4. The water-feeding apparatus of claim 1 wherein said water-supplying means also includes an ancillary conduit opening into said mixture passage, said ancillary conduit by-passing said valve member.

5. The water-feeding apparatus of claim 1 wherein said water-supplying mweans includes a water pump.

6. The water-feeding apparatus of claim 4 wherein said water-supplying means is subject to a pressure differential between the mixture passage and the atmosphere.

7. The water-feeding apparatus of claim 4 also including valve means sensitive to a pressure differential between said mixture passage and the atmosphere for closing both said main conduit and said ancillary conduit when the engine is not functioning.

8. In an internal combustion engine utilizing an air/fuel mixing device, a combustion chamber, a mixture passage for conducting air/fuel mixture from the mixing device to the combustion chamber, water-feeding apparatus comprising:
   means for supplying water, including a water reservoir, and a main conduit and an ancillary conduit interconnecting said water reservoir and the mixture passage, said main conduit being larger than said ancillary conduit;
   a valve member for opening and closing said main conduit;
   means for actuating said valve member including first and second diaphragm chambers, said first diaphragm chamber communicating with the mixture passage, a diaphragm separating said first and second diaphragm chambers, said diaphragm being connected to said valve member and a spring acting on said diaphragm for biasing said valve member toward a position for closing said main conduit; and
   means for delaying the closing of said main conduit by said valve member under bias as said pressure in said intake passage is decreased including a pressure delay chamber communicating with said second diaphragm chamber and the mixture passage.

9. The water-feeding apparatus of claim 8 wherein said water-supplying means includes a water-pumping diaphragm dividing said water reservoir into a water chamber and a pressure chamber, said pressure chamber communicating with the mixture passage, and resilient means for biasing said water-pumping diaphragm toward said water chamber.

10. The water-feeding apparatus of claim 9 wherein said water-supplying means also includes a water supply, conduit means interconnecting said water supply and said water chamber and a check valve for preventing the return of water from said water chamber to said water supply.

11. The water-feeding apparatus of claim 8 wherein said water-supplying means also includes a water supply, conduit means interconnecting said water supply and said water reservoir, a check valve for preventing the return of water from said water reservoir to said water supply, a piston slidably mounted in said water reservoir, said piston having a head acting on water in said water reservoir and means for actuating said piston, said piston and said piston-actuating means forming water-pumping means.

12. The water-feeding apparatus of claim 11 wherein said engine also utilizes an accelerator and wherein said piston-actuating means includes means interconnecting said piston and said accelertor.

13. The water-feeding apparatus of claim 12 wherein said water-supplying means also includes a pressure-absorbing chamber communicating with said water reservoir.

14. The water-feeding apparatus of claim 13 wherein said pressure-absorbing chamber includes a pressure-absorbing piston under bias.

15. The water-feeding apparatus of claim 11 wherein said piston-actuating means includes pressure-sensitive means.

16. The water-feeding apparatus of claim 8 also including valve means sensitive to a pressure differential between said mixture passage and the atmosphere for closing both said main conduit and said ancillary conduit when the engine is not functioning.

17. In an internal combustion engine utilizing an air/fuel mixing device, a combustion chamber, a mixture passage for conducting air/fuel mixture from the mixing device to the combustion chamber, water-feeding apparatus comprising:
means for supplying water, including a water reservoir, a main conduit and an ancillary conduit interconnecting said water reservoir and the mixture passage, said main conduit being larger than said ancillary conduit, a piston slidably mounted in said water reservoir, said piston having a head acting on water in said water reservoir and pressure-sensitive means for actuating said piston, said piston and said piston-actuating means forming water-pumping means;
a valve member for opening and closing said main conduit;
means for actuating said valve member including first and second diaphragm chambers, said first diaphragm chamber communicating with the mixture passage, a diaphragm separating said first and second diaphragm chambers, said diaphragm being connected to said valve member and a spring acting on said diaphragm for biasing said valve member toward a position for closing said main conduit; and means for delaying the closing of said main conduit by said valve member under bias as said pressure in said intake passage is decreased including a pressure-delay chamber communicating with said second diaphragm chamber and the mixture passage.

18. The water-feeding apparatus of claim 17 wherein said pressure-sensitive means for actuating said piston includes first and second pressure-differential chambers, a pressure-differential diaphragm separating said first and second pressure-differential chambers, said pressure-differential diaphragm being connected to said piston and being biased to maximize the volume of water in said water reservoir and means for generating a pressure differential across said pressure differential diaphragm as a function of pressure in said mixture passage.

19. The water-feeding apparatus of claim 18 wherein said means for generating a pressure differential across said pressure-differential diaphragm includes a first passage for communicating pressure between said mixture passage and said first pressure-differential chamber and a second passage for communicating pressure between said mixture passage and said second pressure-differential chamber and means for delaying the communication of pressure to said first pressure-differential chamber with respect to said second pressure differential-chamber and thereby actuating said pressure-differential diaphragm and said piston against said bias.

20. The water-feeding apparatus of claim 19 wherein said means for delaying the closing of said main conduit also includes a mixture reservoir and wherein said pressure delay chamber communicates with said second diaphragm chamber through said mixture reservoir.

21. The water-feeding apparatus of claim 20 wherein said first pressure-differential chamber communicates with the mixture passage through said mixture reservoir and said pressure delay chamber and wherein said second passage includes a check valve permitting pressure communication therethrough only from the mixture passage to said second pressure-differential chamber.

22. The water-feeding apparatus of claim 17 also including valve means sensitive to a pressure differential between said mixture passage and the atmosphere for closing both said main conduit and said ancillary conduit when the engine is not functioning.

23. The water-feeding apparatus of claim 21 also including valve means sensitive to a pressure differential between said mixture passage and the atmosphere for closing both said main conduit and said ancillary conduit when the engine is not functioning.

24. The water-feeding apparatus of claim 23 wherein said valve means for closing both said main conduit and said ancillary conduit includes a shut-off valve member biased toward closing both said main conduit and said ancillary conduit, a shut-off diaphragm for actuating said shut-off valve member, means for applying atmospheric pressure to one side of said shut-off diaphragm, and means for applying vacuum in said mixture passage to the other side of said diaphragm for opening said shut-off valve member against bias.

25. The water-feeding apparatus of claim 19 wherein said means for delaying the communication of pressure to said first pressure-differential chamber includes a pressure-delay valve for opening and closing said first passage, a pressure-delay diaphragm for controlling said pressure-delay valve, said pressure-delay diaphragm being biased for opening said pressure-delay valve, said pressure-delay diaphragm being sensitive to pressure in said first passage acting to close said pressure-delay valve and being sensitive to pressure in said second diaphragm chamber of said means for delaying the closing of said main conduit acting to open said pressure delay valve.

26. The water-feeding apparatus of claim 25 wherein said pressure-delay chamber of said means for delaying the closing of said main conduit and said second passage each includes a throttle of substantially the same capacity and wherein said second passage also includes a check valve for permitting the communication of pressure therethrough only from the mixture passage toward said second pressure-differential chamber.

27. The water-feeding apparatus of claim 25 also including valve means sensitive to a pressure differential between the mixture passage and the atmosphere for closing both said main conduit and said ancillary conduit when the engine is not operating.

28. In an internal combustion engine utilizing a carburetor, a combustion chamber, a mixture passage for conducting air/fuel mixture from the carburetor to the combustion chamber, water-feeding apparatus comprising:

means for supplying water, including a water reservoir, a main conduit and an ancillary conduit interconnecting said water reservoir and the mixture passage, said main conduit being larger than said ancillary conduit, a piston slidably mounted in said water reservoir, said piston having a head acting on water in said water reservoir and pressure-sensitive means for actuating said piston, said piston and said piston-actuating means forming water-pumping means;

a valve member for opening and closing said main conduit;

a venturi in the carburetor;

means for actuating said valve member including first and second diaphragm chambers said first diaphragm chamber communicating with the atmosphere and said second diaphragm chamber communicating with said venturi, a diaphragm separating said first and second diaphragm chambers, said diaphragm being connected to said valve member, and means for biasing said valve member toward a position for closing said main conduit.

29. The water-feeding apparatus of claim 28 wherein said pressure-sensitive means for actuating said piston includes a piston-actuating diaphragm biased for maximizing the volume of water in said water reservoir, means for applying atmospheric pressure to said piston-actuating diaphragm for actuating said piston against bias and means communicating with said venturi for applying pressure in said venturi to the side of said piston-actuating diaphragm opposite to said atmospheric pressure.

* * * * *